3,823,152
3-SUBSTITUTED-2-PIPERIDINETHIONES AND
HOMOLOGUES THEREOF
Akiro Morimoto, Matsubara, Hisashi Takasugi, Ikeda,
Yoshiharu Nakai, Otsu, and Takao Watanabe, Ikeda,
Japan, assignors to Fujisawa Pharmaceutical Co., Ltd.
No Drawing. Filed July 29, 1971, Ser. No. 172,347
Claims priority, application Japan, July 30, 1970,
45/67,049; Sept. 4, 1970, 45/77,908
Int. Cl. C07d 29/36
U.S. Cl. 260—293.69    2 Claims

ABSTRACT OF THE DISCLOSURE

This invention relates to compounds of the formula:

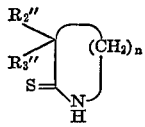

wherein $n$ is 3 or 4, $R_2''$ is selected from the group consisting of

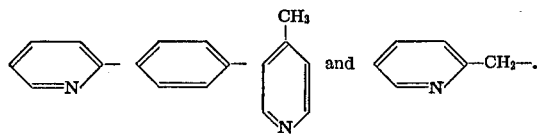

and $R_3''$ is selected from the group consisting of

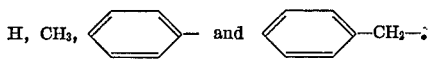

These compounds inhibit gastric secretion and are useful in treatment for a digestive ulcer.

---

This invention relates to new thioacetamide derivatives and their pharmaceutically acceptable salts which posses an inhibiting activity on a gastric secretion and which are useful in therapeutic and precautionary treatment for a digestive ulcer, processes for preparing the same and a composition thereof.

The thioacetamide derivatives can be represented by the following general formula:

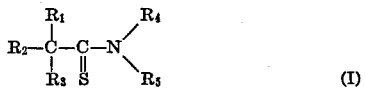

wherein $R_1$ is a heterocyclic radical, $R_2$ is an aralkyl or heterocyclic radical or a lower alkyl radical substituted with a heterocyclic radical, and $R_3$, $R_4$ and $R_5$ are each hydrogen atom; or $R_1$ is a heterocyclic radical, $R_2$ and $R_3$ are both lower alkyl radicals which are linked together directly to form a 3- to 7-membered saturated ring, and $R_4$ and $R_5$ are each hydrogen atom; or $R_1$ and $R_4$ are both lower alkyl radicals which are linked together directly to form a thiolactam ring, $R_2$ is a heterocyclic or aryl radical or a lower alkyl radical substituted with a heterocyclic radical, $R_3$ is a lower alkyl, aryl or aralkyl radical or a hydrogen atom, and $R_5$ is a lower alkyl, aryl or aralkyl radical or a hydrogen atom; or $R_1$ and $R_2$ bound together represent a condensed heterocyclidene radical, and $R_3$, $R_4$ and $R_5$ are each hydrogen atom.

The heterocyclic and condensed heterocyclidene radicals in the above formula contain at least one nitrogen atom as a hetero atom and may further contain hetero atom(s) selected from nitrogen, oxygen and sulfur atoms.

As a suitable heterocyclic radical in the above formula there may be mentioned, for example, an unsaturated heteromonocyclic radical containing nitrogen atom(s) (e.g., pyridyl, pyrazinyl, pyrimidinyl, pyridazinyl, pyrrolyl, imidazolyl, pyrazolyl, etc.), unsaturated heterodicyclic radical containing nitrogen atom(s) (e.g. indolizinyl, isoindolyl, indolyl, indazolyl, benzimidazolyl, purinyl, isoquinolyl, quinolyl, etc.), unsaturated heteromonocyclic radical containing nitrogen atom(s) and a sulfur atom (e.g. thiazolyl, thiadiazolyl, isothiazolyl, thiatriazolyl, etc.) or saturated heteromonocyclic radical containing nitrogen atom(s) and an oxygen atom (e.g. morpholino, etc.).

As a suitable condensed heterocyclidene radical in the above formula there may be mentioned, for example, a condensed heterocyclidene radical containing nitrogen atom(s), for example, 1,2,3,4-tetrahydroisoquinolidene, 5,6,7,8-tetrahydroisoquinolidene, 1,2,3,4-tetrahydroquinolidene, 5,6,7,8-tetrahydroquinolidene, indolidene or quinolizinidene radicals.

The aforementioned heterocyclic and condensed heterocyclidene radicals may carry one or more appropriate substituents such as a lower alkyl radical of not more than 4 carbon atoms, for example, methyl, ethyl, propyl, isopropyl, butyl or isobutyl radical, a lower alkoxy radical of not more than 4 carbon atoms, for example, methoxy, ethoxy, propoxy, isopropoxy, butoxy or isobutoxy radical and the like.

As a suitable lower alkyl radical in the above formula they may be mentioned, for example, a lower alkyl radical of not more than 6 carbon atoms, and preferably a lower alkyl radical of not more than 4 carbon atoms, for example, methyl, ethyl, propyl, isopropyl, butyl, isobutyl radical and the like.

As a suitable aryl radical in the above formula there may be mentioned, for example, an aryl radical of not more than 10 carbon atoms, for example, phenyl, xylyl, tolyl radical and the like.

As a suitable aralkyl radical in the above formula there may be mentioned, for example, an aralkyl radical of not more than 12 carbon atoms, and preferably an aralkyl radical of 7 to 10 carbon atoms, for example, benzyl, phenethyl, 3-phenylpropyl, 2-phenylpropyl, xylyl-methyl radical and the like.

The aforementioned aryl and aralkyl radicals may carry one or more appropriate substituents such as a halogen atom (e.g. chlorine, bromine, etc.), a hydroxy radical and the like.

The thioacetamide derivatives of the formula I may be divided into the following classes:

(a) Those having the formula:

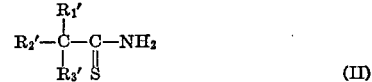

wherein $R_1'$ is a heterocyclic radical, $R_2'$ is an aralkyl or heterocyclic radical or a lower alkyl radical substituted with a heterocyclic radical, and $R_3'$ is a hydrogen atom; or $R_1'$ is a heterocyclic radical, and $R_2'$ and $R_3'$ are both lower alkyl radicals which are linked together directly to form a 3- 7-membered saturated ring; or $R_1'$ and $R_2'$ bound together represent a condensed heterocyclidene radical, and $R_3'$ is a hydrogen atom.

(b) Those having the formula:

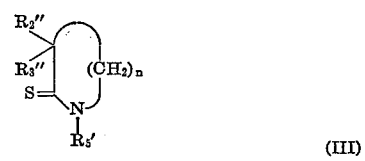

wherein $R_2''$ is a heterocyclic or aryl radical or a lower alkyl radical substituted with a heterocyclic radical, $R_3''$ is a lower alkyl, aryl or aralkyl radical or a hydrogen atom, $R_5'$ is a lower alkyl, aryl or aralkyl radical or a hydrogen atom, and $n$ is 2, 3 or 4.

It has been found that the thioacetamide derivatives of the formula (I) and their pharmaceutically acceptable salts commonly and characteristically possess an inhibiting activity on a gastric secretion but no anticholinergic and central nervous system effects, and may be characteristically useful in therapeutic and precautionary treatment for a digestive ulcer.

Accordingly, a basic feature of the present invention is to provide new thioacetamide derivatives of the formula (I) and their pharmaceutically acceptable salts.

According to a feature of the invention, there are provided new thioacetamide derivatives of the formula (I) and their pharmaceutically acceptable salts possessing a selective inhibiting activity on a gastric secretion and being useful in therapeutic and precautionary treatment for a digestive ulcer. According to a further feature of the invention, there may be provided a pharmaceutical composition comprising, as an active ingredient, new thioacetamide derivatives of the formula (I) and pharmaceutically acceptable carriers as therapeutic and precautionary agents for a digestive ulcer.

According to a still further feature of the invention, there are provided processes for preparing new thioacetamide derivatives of the formula (I) and their pharmaceutically acceptable salts. These and other features of the invention will be apparent to those conversant with the art to which the present invention pertains from the subsequent descriptions.

The compound (I) of this invention, including the compound (II) and (III) can be prepared by the methods as mentioned below.

The compound of the formula (I) can be prepared by reacting an acetamide derivative of the formula:

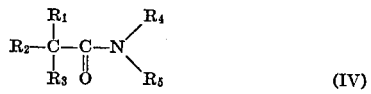

(IV)

wherein $R_1$ is a heterocyclic radical, $R_2$ is an aralkyl or heterocyclic radical or a lower alkyl radical substituted with a heterocyclic radical, and $R_3$, $R_4$ and $R_5$ are each hydrogen atom; or $R_1$ is a heterocyclic radical, $R_2$ and $R_3$ are both lower alkyl radicals which are linked together directly to form a 3- to 7-membered saturated ring, and $R_4$ and $R_5$ are each hydrogen atom; or $R_1$ and $R_4$ are both lower alkyl radicals which are linked together directly to form a thiolactam ring, $R_2$ is a heterocyclic or aryl radical or a lower alkyl radical substituted with a heterocyclic radical, $R_3$ is a lower alkyl, aryl or aralkyl radical or a hydrogen atom, and $R_5$ is a lower alkyl, aryl or aralkyl radical or a hydrogen atom; or $R_1$ and $R_2$ bound together represent a condensed heterocyclidene radical, and $R_3$, $R_4$ and $R_5$ are each hydrogen atom, with an inorganic sulfide.

3-(2-Pyridyl)-2-piperidone which falls within the scope of the starting compounds (IV) to be used in the present reaction can be prepared according to a manner reported in The Journal of the American Chemical Society, volume 81 (1959), page 737, and 3-phenyl-2-piperidone and 1-(alkyl or aralkyl)-3-phenyl-2-piperidone, according to a manner reported in Chemical Abstracts, volume 45 (1951), column 7154e. The other starting compounds (IV) can be prepared according to a manner similar to those of the said journals.

As a suitable inorganic sulfide to be used in the above reaction there may be mentioned, for example, phosphorus pentasulfide, sodium sulfide, potassium sulfide, ammonium sulfide, ammonium polysulfide, calcium sulfide, barium sulfide, ferrous sulfide, ferric sulfide and the like.

The present reaction is effected with or without a solvent preferably with heating. As a suitable solvent there may be mentioned, for example, pyridine, benzene, toluene, xylene, ether, tetrahydrofuran, dioxane and the like.

The compound of the formula (II) can be prepared by reacting an acetonitrile derivative of the formula:

(V)

wherein $R_1'$ is a heterocyclic radical, $R_2'$ is an aralkyl or heterocyclic radical or a lower alkyl radical substituted with a heterocyclic radical and $R_3'$ is a hydrogen atom; or $R_1'$ is a heterocyclic radical, and $R_2'$ and $R_3'$ are both lower alkyl radicals which are linked together directly to form a 3- to 7-membered saturated ring; or $R_1'$ and $R_2'$ bound together represent a condensed heterocyclidene radical, and $R_3'$ is a hydrogen atom, or an iminoether derived therefrom by addition of an alcohol, with an inorganic sulfide.

α-Benzyl-2-pyridineacetonitrile which falls within the scope of the starting compound (V) to be used in the present reaction can be prepared according to a manner reported in Yakugaku Zashi (Japan), volume 85 (1965), page 812, and the other starting compounds of the present reaction can be prepared according to a manner similar to that of the said journal.

As a suitable inorganic sulfide used in the above reaction there may be mentioned, for example, hydrogen sulfide, phosphorus pentasulfide, sodium sulfide, ammonium polysulfide, potassium sulfide, ammonium sulfide, calcium sulfide, barium sulfide and the like.

The present reaction is carried out with or without a solvent and preferably with a solvent. As a suitable solvent there may be mentioned, for example, methanol, ethanol, benzene, toluene, xylene, ether, tetrahydrofuran, dioxane, chloroform, pyridine, dimethylformamide and the like. There is no limitation to the reaction temperature. However, the reaction is preferably carried out at above room temperature. The reaction can be preferably carried out in the presence of a base such as pyridine, ammonia, triethylamine, triethanolamine, sodium, potassium and the like.

As stated above, the thioacetamide derivatives (I) and their pharmaceutically acceptable salts show an inhibiting activity on a gastric secretion but no anti-cholinergic and central nervous system effects. Some of the test results by which the said activities are evidenced are shown below.

TEST 1

Inhibition of gastric secretion in Shay's rats

Method: Male Sprague-Dawley JCL strain rats, weighing 200 to 300 g., were used. Four hours after the pyloric ligation, the animals were killed and their stomachs were removed. The test compound was administered subcutaneously 30 min. before the pyloric ligation. The volume of the gastric fluid was measured and expressed as milliliters per 100 g. of body weight. The mean volume of animals receiving an equal dose was compared with that of the control. The $ED_{50}$ values were calculated.

TABLE 1

| Compound: | $ED_{50}$ (mg./kg.) |
|---|---|
| 3 - (2 - Pyridyl) - 2 - piperidinethion hydrochloride | 4.6 |
| 3-(2-Pyridyl)-3-benzyl-2-piperidinethione | 38.8 |
| 3-(2-Pyridyl)-3-methyl-2-piperidinethione | 11.1 |
| 3-(2-Pyridyl)-3-phenyl-2-piperidinethione | 20.6 |
| 3-(4-Methyl - 2 - pyridyl) - 2 - piperidinethione hydrochloride | 31.1 |
| 1,2,3,4 - Tetrahydro - 1 - isoquinolylidenethioacetamide | 16.5 |
| α-(p-Chlorobenzyl-2-pyridinethioacetamide | 5.4 |
| α-(2-Pyridyl)-3-pyridinethiopropionamide | 22.0 |
| α-Benzyl-2-pyridinethioacetamide | 5.0 |
| α-Morpholino-2-pyridinethioacetamide | 64.0 |
| α-(o-Chlorobenzyl)-2-pyridinethioacetamide | 22.0 |
| 1-(2-Pyridyl)cyclopentanethioamide | 50.0 |
| α-(2-Pyridyl)-2-pyridinethioacetamide | 16.0 |

TEST 2

Inhibition of gastric secretion in dogs (Fistula method)

Method: Mongrel adults dogs, weighing 7–15 kg., were used after a 22 hour deprivation of food but no water. They were anesthetized with chloralose (50 mg./kg.) and urethane (1.5 g./kg.) and a gastric fistula was prepared in each animal. The prepared animals were tied out on a specific board, lying prone, and the gastric fluid was estimated for volume and acidity every 15 minutes. After approximately constant basic excretion volumes were obtained consecutively some times, the tests were made. The test compound was administered 60 minutes before a stimulating drug of the gastric secretion, gastric tetrapeptide (30 μg./h.). The $ED_{50}$ value was calculated.

TABLE 2

| Compound: | $ED_{50}$ (mg./kg.) |
|---|---|
| 3-(2-Pyridyl)-2-piperidinethione hydrochloride | 5.0 |
| α-Benzyl-2-pyridinethioacetamide | 2.6 |

TEST 3

Antagonism of histamine- and acetylcholine-induced contraction of the isolated guinea pig ileum (Magnus technique)

Method: Strips of ileum, 2 cm. in length, were removed from male guinea pigs (300–500 g.) and suspended in 50 ml. Tyrode's baths. The temperature of the bath was maintained at 27° C. and Tyrode's solution was saturated with a mixture of 95% oxygen and 5% carbon dioxide. The contraction of the ileal strip was recorded with a strain gauge. The spasmogen employed was acetlycholine (0.2 μg./ml. or histamine phosphate (0.1 μg./ml.). The test compound, 3-(2-pyridyl)-2-piperidinethione, was added to the bath one minute prior to addition of the spasmogen. The $ED_{50}$ inhibitory concentration was computed from the size of the ileal contraction on the graph.

TABLE 3

| Spasmogen: | $ED_{50}$ |
|---|---|
| Acetylcholine chloride | Inactive |
| Histamine phosphate | Inactive |

TEST 4

Acute toxicity

Method: The test compound was subcutaneously administered to groups of dd-strain male mice, each group consisting of 10 animals. Death was numbered for 2 days after the administration, and the $LD_{50}$ value was calculated according to the Litchfield-Wilcoxon method.

TABLE 4

| Compound: | $LD_{50}$ |
|---|---|
| α - Benzyl - 2 - pyridinethioacetamvide hydrochloride | 380 |
| α - Benzyl - 2 - pyridinethioacetamide hydrochloride | 480 |
| 1,2,3,4 - Tetrahydro - 1 - isoquinolylidenethioacetamide | 560 |

This invention is illustrated but not limited by the following Examples.

EXAMPLE 1

A solution of α-(o-chlorobenzyl)-2-pyridine-acetonitrile (1.5 g.) in methanol (20 cc.) with amonium polysulfide was sealed in glass tube and the glass tube was allowed to stand for 2 days. The solvent of the reaction mixture was distilled off and the residue was subjected to chromatography over alumina in which a mixed solvent of chloroform and acetone (4:1) was used as a developer. Te solvent of the eluate was distilled off and the residue was recrystallized from ethanol to give colorless crystals (0.75 g.) of α-o-chlorobenzyl)-2-pyridinethioacetamide, m.p. 136–138° C.

*Analysis.*—Calculated for $C_{14}H_{13}N_2SCl$: C, 60.75; H, 4.73; N, 10.12; Cl, 12.81. Found: C, 60.98; H, 4.66; N, 9.89; Cl, 12.87.

The following compounds were prepared according to a manner similar to the preceding Example 1.

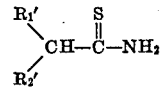

| Number | $R_1'$ | $R_2'$ | Physicochemical property, M.P., ° C. |
|---|---|---|---|
| 2 | pyridyl (2-) | 3,4-dihydroxy-phenyl with CH₃ | [1] 182–183.5 |
| 3 | pyridyl (2-) | pyridyl-CH₂– | 66–70 |
| 4 | pyridyl (2-) | Cl-phenyl-CH₂– | 139–141 |
| 5 | Same as above | phenyl-CH₂– | 114–116 |
| 6 | do | pyridyl | 158–161 |
| 7 | do | morpholino-N– | 160–163 |
| 8 | benzimidazolyl | phenyl-CH₂– | 191–193.5 |

[1] Decomposed.

EXAMPLE 9

Triethylamine (10 cc.) was added to a solution of 6,7-dimethoxy - 1,2,3,4 - tetrahydro-1-isoquinolylideneacetonitrile (2.2 g.) in pyridine (60 cc.) and the mixture was passed with hydrogen sulfide gas for 5 hours under stirring. The solvent was distilled off completely by adding water thereto, and to the residue was added water. Precipitates were collected by filtration, dried and recrystallized from 95% ethanol to give yellowish needles (1.4 g.) of 6,7-dimethoxy-1,2,3,4-tetrahydro - 1 - isoquinolylidenethioacetamide, m.p. 168–170° C.

*Analysis.*—Calculated for $C_{13}H_{16}N_2O_2S$: C, 59.06; H 6.10; N, 10.60; S, 12.13. Found: C, 59.10; H, 6.11; N, 10.61; S, 12.30.

EXAMPLE 10

Triethylamine (8 cc.) was added to a solution of 1,2,3,4-tetrahydro - 1 - isoquinolylideneacetonitrile (2.3 g.) in pyridine (30 cc.) and the mixture was passed with hydrogen sulfide gas for 3.5 hours under stirring. The solvent was distilled off completely by adding water thereto and to the residue was added ethanol. The ethanol solution was concentrated to dryness, and the residue was subjected to chromatography over alumina in which a mixed solvent of benzene and ethyl acetate (4:1) was used as a developer. The solvent of the eluate which was obtained in the latter half was distilled off and the residue was recrystallized from benzene to give yellowish prisms (0.3 g.) of 1,2,3,4-tetrahydro-1-isoquinolylidenethioacetamide, m.p. 137.5–139.5° C.

*Analysis.*—Calculated for $C_{11}H_{12}N_2S$: C, 64.67; H, 5.92; N, 13.71. Found: C, 64.40; H, 5.85; N, 13.79.

EXAMPLE 11

1-(2-Pyridyl)cyclopentanethioamide, m.p. 188–189° C., was prepared according to a manner similar to the preceding Example 10.

EXAMPLE 12

A solution of phosphorus pentasulfide (1.86 g.) in pyridine (48 cc.) was added to a solution of 3-(2-pyridyl)-2-piperidone (7.12 g.) in pyridine (24 cc.) and the mixture was refluxed for about 2.5 hours under stirring. After the completion of the reaction, the mixture was poured into a hot water (850 cc.) under stirring and allowed to stand. Precipitates were removed by filtration and the filtrate was extracted six times with ethyl acetate (400 cc.). The ethyl acetate layer was dried and the solvent was distilled off. The residue was subjected to chromatography in which a mixed solvent of benzene and acetone (2:1) was used as a developer and the solvent of the eluate obtained in the latter half was distilled off to give crystals (5.47 g.) of 3-(2-pyridyl)-2-piperidinethione, m.p. 145–146° C.

*Analysis.*—Calculated for $C_{10}H_{12}N_2S$: C, 62.46; H, 6.29; N, 14.57; S, 16.68. Found: C, 62.49; H, 6.27; N, 14.47; S, 16.98.

To a solution of 3-(2-pyridyl)-2-piperidinethione (5.4 g.) in 99% ethanol (80 cc.) was added absolute ether (100 cc.), and the mixture was passed with dry hydrogen chloride gas. Precipitates were collected by filtration and washed with a mixed solvent of ethanol and ether (1:2) and then dried. This material was further dissolved in hot 99% ethanol (200 cc.) and the ethanol solution was filtered. To the filtrate was added ether (80 cc.) and the mixture was allowed to stand. Precipitates were collected by filtration and dried to give crystals (4.75 g.) of 3-(2-pyridyl)-2-piperidinethione hydrochloride, m.p. 233–234° C. (decomp.).

*Analysis.*—Calculated for $C_{10}H_{13}N_2SCl$: C, 52.51; H, 5.73; N, 12.25; S, 14.02; Cl, 15.50. Found: C, 52.66; H, 5.72; N, 12.19; S, 13.75; Cl, 15.77.

The following compounds were prepared according to a manner similar to the preceding Example 12.

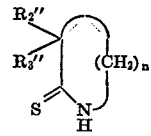

| Number | $R_2''$ | $R_3''$ | $n$ | Physicochemical property, M.P., °C. |
|---|---|---|---|---|
| 13 | pyridyl | -benzyl-CH₂— | 3 | 120–122 |
| 14 | Same as above | phenyl | 3 | 162–163 |
| 15 | do | $CH_3$— | 3 | 120.5–121.5 |
| 16 | do | H | 3 | [1] 224–227 |
| 17 | phenyl | H | 3 | 157–158 |
| 18 | 4-methylpyridyl | H | 3 | 257–260 |
| 19 | pyridyl | H | 4 | [2] 114–116 [1] 197–209 |
| 20 | pyridyl-CH₂— | H | 3 | [1] 202–205 |
| 21 | thiazolyl | H | 3 | 164–165 |

[1] Hydrochloride.
[2] Free base.

EXAMPLE 22

Phosphorus pentasulfide (1.0 g.) was added to a solution of α-(2-pyridyl)-2-pyridineacetamide (1.0 g.) in pyridine (10 cc.) and the mixture was heated on the bath of 100° C. for 1 hours. The solvent of the mixture was distilled off and the residue were added water and chloroform, and the chloroform layer was separated and dried. The chloroform was distilled off and the residue was subjected to chromatography in which a mixed solvent of chloroform and acetone (4:1) was used as a developer. The solvent of the eluate obtained in the latter half was distilled off to give, as the residue, crystals (0.4 g.) of α-(2-pyridyl)-2-pyridinethioacetamide, m.p. 158–161° C.

*Analysis.*—Calculated for $C_{12}H_{11}N_3S$: C, 62.85; H, 4.84; N, 18.33. Found: C, 63.00; H, 4.69; N, 18.62.

The following compounds were prepared according to a manner similar to the preceding Example 22.

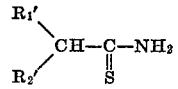

| Number | $R_1'$ | $R_2'$ | Physicochemical property, M.P., °C. |
|---|---|---|---|
| 23 | pyridyl | chlorobenzyl-CH₂— | 136–138 |
| 24 | pyridyl | dihydroxybenzyl-CH₂— | 182–183.5 |
| 25 | Same as above | pyridyl-CH₂— | 66–70 |

TABLE—Continued

| Number | R₁' | R₂' | Physico-chemical property M.P., °C. |
|---|---|---|---|
| 26 | Same as No. 24 | Cl-⟨⟩-CH₂- | 139-141 |
| 27 | do | ⟨⟩-CH₂- | 114-116 |
| 28 | do | O⟨⟩N- | 160-163 |
| 29 | (indole) | ⟨⟩-CH₂- | 191-193.5 |
| 30 | ⟨N⟩- | ⟨N⟩- | 158-161 |

(structure: X-, Y- substituted tetrahydroisoquinoline with NH, CH-C(=S)-NH₂)

| No. | X | Y | Physico-chemical property, M.P., °C. |
|---|---|---|---|
| 31 | CH₃O— | CH₃O— | 168-170 |
| 32 | H | H | 137-139.5 |
| 33 | 1-(2-pyridyl)cyclopentanethioamide | | 188-189 |
| 34 | 1,3-dimethyl-3-(2-pyridyl)-2-piperidinethione | | 76.5-77 |
| 35 | 1-benzyl-3-(2-pyridyl)-2-piperidinethione | | 66-68 |
| 36 | 1-methyl-3-phenyl-3-(2-pyridyl)-2-piperidinethione | | 152-153.5 |
| 37 | 1-methyl-3-benzyl-3-(2-pyridyl)-2-piperidinethione | | 113-114 |
| 38 | 1-benzyl-3-methyl-3-(2-pyridyl)-2-piperidinethione | | 84.5-85.5 |
| 39 | 1,3-dibenzyl-3-(2-pyridyl)-2-piperidinethione (HCl) | | 173-176.5 |
| 40 | 1-benzyl-3-phenyl-3-(2-pyridyl)-2-piperidinethione | | 94-95 |
| 41 | 1,3-diphenyl-3-(2-pyridyl)-2-pyrrolidinethione | | 154.5-155.5 |

Because of the possession of the said activity, the thioacetamide derivatives of the formula (I) and their pharmaceutically acceptable salts are useful as therapeutic and precautionary agents for a digestive ulcer.

The thioacetamide derivatives of the formula (I) and their pharmaceutically acceptable salts can be administered by the conventional methods, the conventional types of unit dosages or with the conventional pharmaceutical carriers to produce an inhibiting activity on a gastric secretion of human beings.

Thus, they can be used in the form of pharmaceutical preparations, which contain them in admixing with a pharmaceutical organic or inorganic carrier material suitable for enteral or parenteral applications. Oral administration by the use of tablets, capsules or in liquid form such as suspensions, solutions or emulsions is particularly advantageous. When formed into tablets, the conventional binding and disintegrating agents used in therapeutic and precautionary unit dosages can be employed. Illustrative of binding agents there can be mentioned glucose, lactose, gum acacia, gelatin, mannitol, starch paste, magnesium trisilicate and talc. Illustrative of disintegrating agents there can be mentioned corn starch, keratin, colloidal silica and potato starch. When administered as liquids the conventional liquid carriers can be used.

The unit dosage or therapeutically or precautionally effective quantity of the compounds (I) and their pharmaceutically acceptable salts for human beings can vary over wide limits such as that of 0.1 milligram to about 100 milligrams. The upper limit is limited only by the degree of effect desired and economic considerations. For oral administration it is preferable to employ from about 1 milligram to about 100 milligrams of the therapeutic or precautionary agent per unit dosage. It is indicated from animal experiments that about 1 to about 10 milligrams dosages administered orally four times daily as needed will provide a preferred daily dosage. Of course, the dosage of the particular therapeutic or precautionary agent used can vary considerably, such as the age of the patient and the degree of therapeutic or precautionary effect desired. Each unit dosage form of the novel therapeutic and precautionary compounds can contain from about 5% to about 95% of the novel therapeutic and precautionary agents by weight of the entire composition with the remainder comprising conventional pharmaceutical carriers. By the term pharmaceutical carrier it is intended to include non-therapeutic materials which are conventionally used with unit dosage and include fillers, diluents, binders, lubricants, disintegrating agents and solvents. Of course, it is possible to administer the novel therapeutics, i.e. the pure compounds, without the use of a pharmaceutical carrier. It is also possible to administer the thioacetamide derivatives of the formula (I) and their pharmaceutically acceptable salts in the form of mixture with other agents which are used as therapeutics for a digestive ulcer.

The following examples illustrate the preparation of the composition, but shall not be limited thereto.

Example A.—Formula of the tablets are given below:

Formula per tablet

| Ingredient | Mg. | Mg. |
|---|---|---|
| 3-(2-pyridyl)-2-piperidinethione hydrochloride | 1.0 | 1.0 |
| Dextrin | | 4.0 |
| Potato starch | | 15.6 |
| Lactose | | 270.0 |
| Spray-dry lactose | 40.2 | |
| Avicel (trademark) | 25.0 | |
| Methylcellulose | | 4.0 |
| Magnesium stearate | 0.9 | 3.2 |
| Potassium carboxymethyl cellulose | 8.0 | 15.0 |
| Colloidal silicic acid | 0.9 | 3.2 |
| Total | 80.0 | 320.0 |
| Coated to make | 150.0 | 560.0 |

Example B.—Formula of the injectable solution is given below:

Ingredient (per one ampoule): Mg.
3 - (2 - Pyridyl) - 2 - piperidinethione hydrochloride _____ 5.0
Sodium chloride _____ 9.0
Distilled water for injection to make 1 cc.
pH 5.0–7.5.

A preferable composition for rectal administration may be suppository, for which bases are exemplified with cacao butter, glycerogelatin, polyvinylalcohol, vegetable hardened oil and the like.

Example C.—Formula of the suppository is as follows:

Formula per suppository

Ingredient: Mg.
3-(2-Pyridyl)-2-piperidinethione _____ 5.0
Witepsol E75 (Trademark) _____ 696.25
Witepsol H12 (Trademark) _____ 696.25

We claim:
1. A thioacetamide compound having the formula

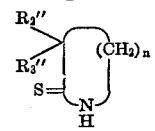

wherein n is 3 or 4, R₂" is selected from the group consisting of

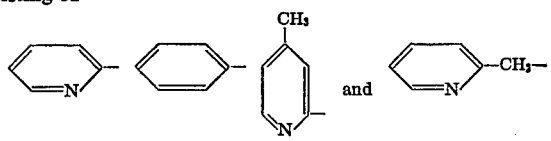

and $R_3''$ is selected from the group consisting of

H, $CH_3-$, 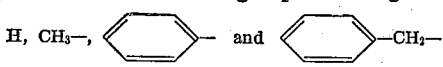

2. A compound according to claim 1 in which the thioacetamide compound is 3-(2-pyridyl)-2-piperidine-thione.

References Cited

UNITED STATES PATENTS 2,524,643  10/1950  Walter et al. ------ 260—293.76
2,742,475  4/1956  Hoffmann et al. -- 260—293.69

OTHER REFERENCES

Medicinal Chemistry, Burger, vol. I (1951), pp. 44, 45, 48.

W. Theilheimer: Synthetic Methods of Organic Chemistry (1952), vol. 96, p. 229.

W. Theilheimer: Synthetic Methods of Organic Chemistry (1955), vol. 9, p. 238.

HENRY R. JILES, Primary Examiner

S. D. WINTERS, Assistant Examiner

U.S. Cl. X.R.

260—309, 310 C, 310 R, 250 A, 252, 306.8 D, 256.5 R, 308 R, 247.1, 283 CN, 283 S, 293.68, 293.73, 293.76, 294.8 E, 294.9, 309.2, 239.3 R; 424—248, 258, 263, 267, 273

UNITED STATES PATENT OFFICE
CERTIFICATE OF CORRECTION

Patent No. 3 823 152          Dated   July 9, 1974

Inventor(s)  Akiro Morimoto, et al.

It is certified that error appears in the above-identified patent and that said Letters Patent are hereby corrected as shown below:

In the headnote, at listing of priority claims, after "July 30, 1970, 45/67,049 insert -- August 18, 1970, 45/72,201 --

In the Abstract of Disclosure, at line 25, the formula which reads:

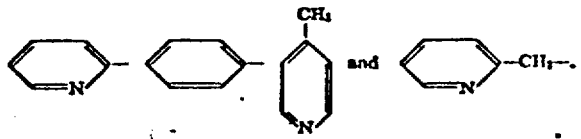

is corrected to read as follows:

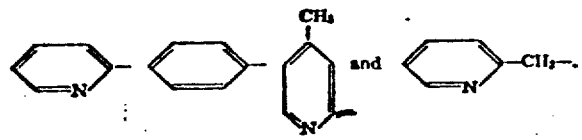

In Column 6, in line 2 of Table of Example 1, the formula which reads:   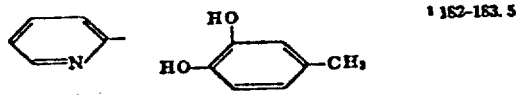

is corrected to read as follows:   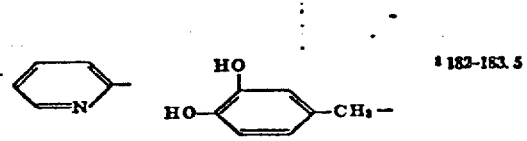

UNITED STATES PATENT OFFICE
CERTIFICATE OF CORRECTION

Patent No. 3,823,152                     Dated July 9, 1974

Inventor(s) Akiro Morimoto, et al.

It is certified that error appears in the above-identified patent and that said Letters Patent are hereby corrected as shown below:

In Column 7, in line 18 of the Table of Example 12, the formula which reads:

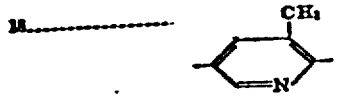

is corrected to read as follows: 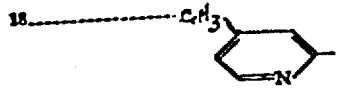

Signed and sealed this 11th day of February 1975.

(SEAL)
Attest:

RUTH C. MASON
Attesting Officer

C. MARSHALL DANN
Commissioner of Patents
and Trademarks